April 18, 1933.  J. ACHARD  1,904,112
DEVICE FOR THE CONTROL OF ELECTRIC ARC WELDING MACHINES
Filed March 13, 1931  2 Sheets-Sheet 1
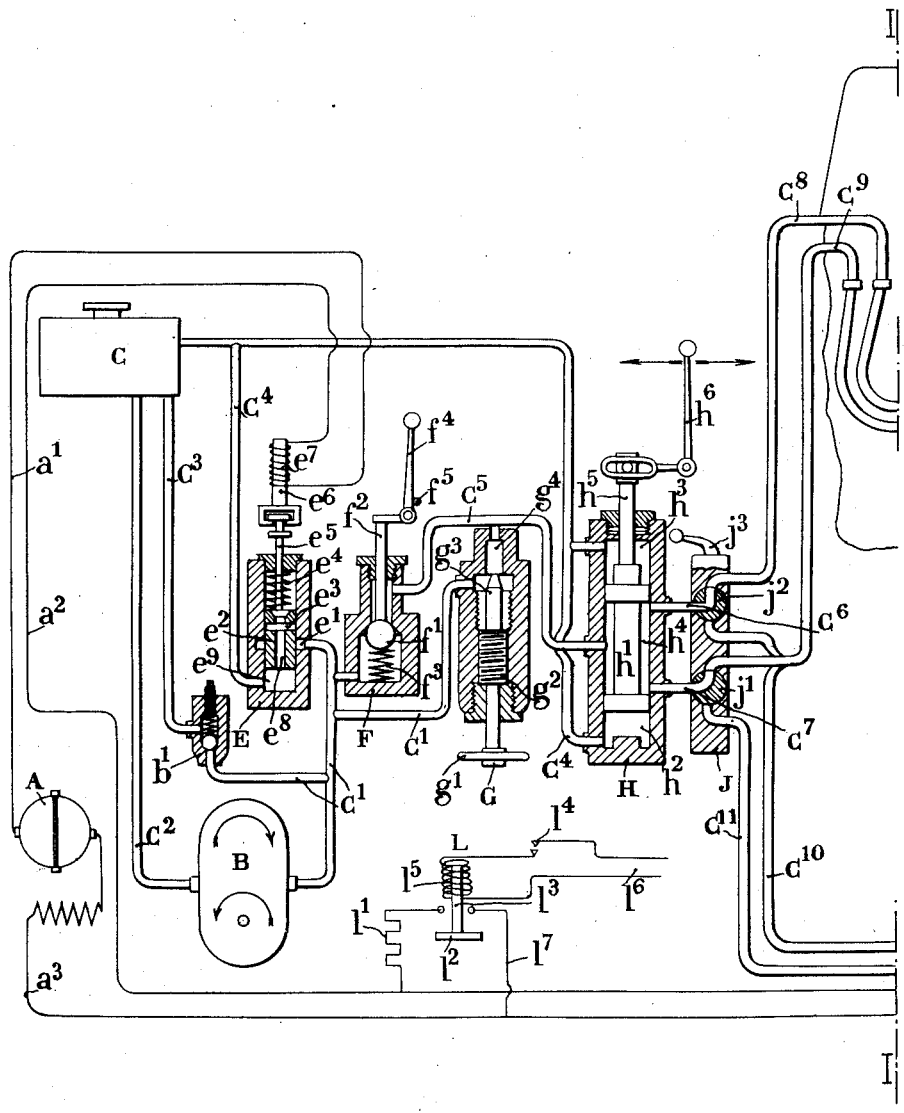
Inventor
Jean Achard
by Robert W Byerly
his atty.

April 18, 1933. J. ACHARD 1,904,112
DEVICE FOR THE CONTROL OF ELECTRIC ARC WELDING MACHINES
Filed March 13, 1931 2 Sheets-Sheet 2
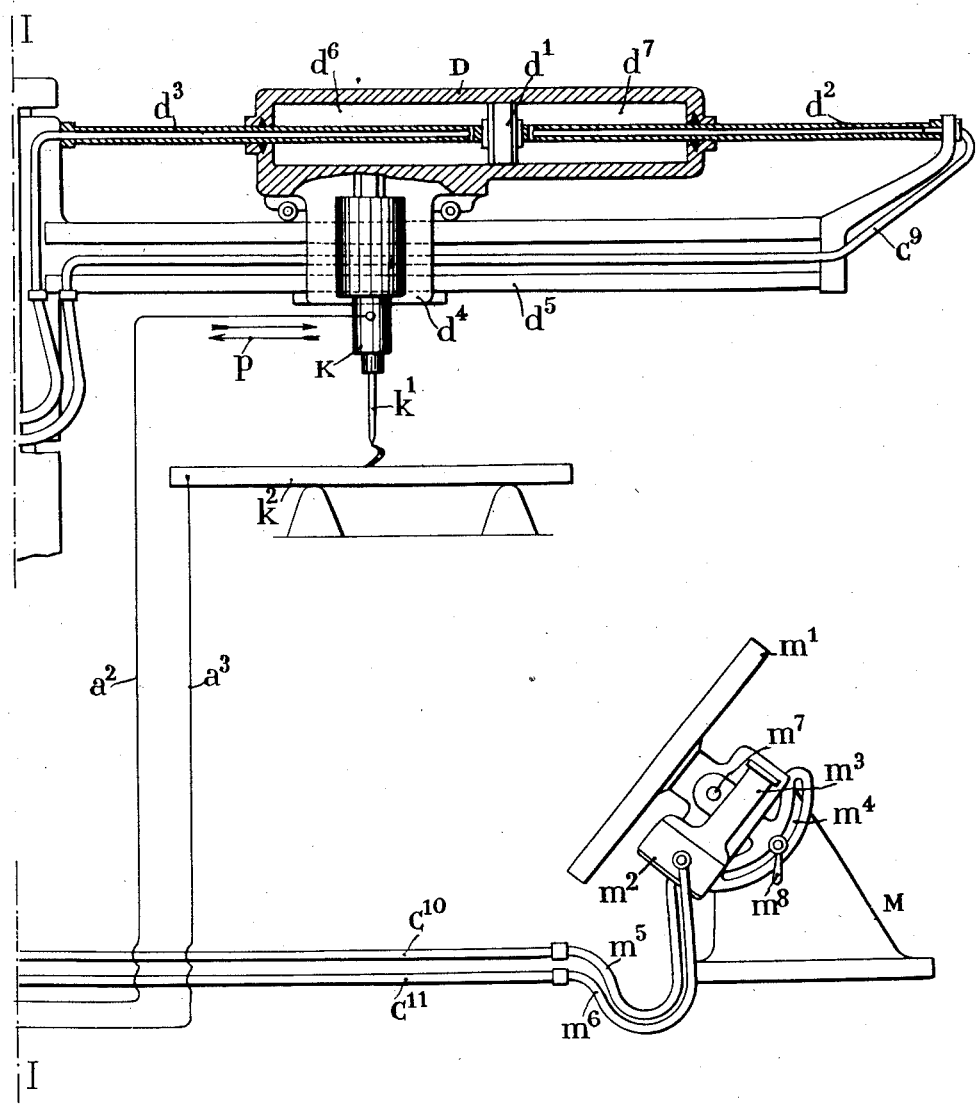
Inventor
Jean Achard.
by Robert W Byerly
his atty.

Patented Apr. 18, 1933

1,904,112

UNITED STATES PATENT OFFICE

JEAN ACHARD, OF PARIS, FRANCE

DEVICE FOR THE CONTROL OF ELECTRIC ARC WELDING MACHINES

Application filed March 13, 1931, Serial No. 522,335, and in France May 14, 1930.

My invention relates to electric arc welding machines and it has for its object to obtain through hydraulic or pneumatic means the automatic control of the relative displacement of the electrode and of the piece to be welded along the line of welding, in machines of that type.

My invention does not include the devices that ensure the advance of the electrode toward the piece to be welded during the fusion of the latter, nor does it relate to the devices for automatically regulating the arc.

My invention consists essentially in providing, on the feed conduits of the cylinder, or, more generally, of the hydraulic or pneumatic engine which actuates the electrode or the piece to be welded, a valve or any equivalent organ whose movable element is controlled by the circuit of the arc itself, in order to allow or to prevent the feed of said engine according as whether the arc is or is not being formed between the electrode and the piece during its welding.

The hydraulic or pneumatic drive is thus made absolutely dependent on the electric welding circuit, so that if current ceases to flow through said circuit, the hydraulic actions cease also at the same moment, and begin again as soon as current is again set up.

It will be readily understood that my invention applies whatever the shape of the line of welding may be, chiefly if it is straight or circular, and that as well in the case of the electrode being stationary and the piece to be welded movable as in the reverse mode of operation.

In these different embodiments, the device according to my invention ensures the automatic stopping of the movable element (electrode or piece to be welded) as soon as the arc ceases to be formed, and the automatic taking up of the movement, the very moment the arc is again formed.

My invention also comprises in its practical embodiment, various auxiliary means for:

Closing the circuit of the valve controlling element for producing a relative displacement of the piece to be welded with respect to the electrode at the beginning of a welding operation, even before the formation of the arc; accelerating the speed of the movable element so as to quickly approach the same for starting the operation; regulating the working speed; reversing the direction of the working; passing from one mode of welding to another, for instance from straight welding to circular welding; in this last case, rotating (through a given angle, variable and predetermined) the piece to be welded with respect to the stationary electrode.

A preferred embodiment of my device will be hereinafter described with reference to the appended drawings, given merely by way of example, and which includes, in a single diagrammatic view, the chief elements of an automatic hydraulic device according to my invention. Said device makes it possible to effect, either a straight welding (the electrode, in the example shown, being moved relatively to the piece to be welded) or a circular welding (the piece rotating with respect to the electrode).

In the drawings, $k^1$ designates the electrode and $k^2$ the piece to be welded. The welding current is provided by a dynamo A to which the electrode and the piece to be welded are connected through conductors $a^1, a^2, a^3$.

The device comprises:

A hydraulic cylinder D, which moves with respect to a piston $d^1$ provided with two tubular rods $d^2$ and $d^3$ which form conduits for feeding two chambers $d^6$ and $d^7$ of the hydraulic cylinder, whose actions are balanced (the two chambers have the same capacity).

A welding head or apparatus K which comprises devices for the advancing of the electrode, while fusion of the pieces proceeds, devices for automatically regulating the arc, all of which devices are already known and have not been shown in the drawings. This welding head K is mounted on a support $d^4$ which is guided along a runway $d^5$.

A pump B provides the fluid under pressure.

A feeding tank C feeds the tank through conduit $C^2$.

A valve E by-passes the pump to the tank when no current is set up in the welding circuit.

For this purpose this valve is operated through an electro-magnet $e^7$ included in circuit $a^2$ and thus traversed by the welding current. The armature $e^6$ of this electro-magnet can actuate, through any suitable connection rod $e^5$ of the sliding part $e^2$ of the valve which is provided with a return spring $e^4$. The valve body is provided with an annular chamber $e^1$ into which opens conduit $C^1$ which is connected to the compression or high pressure side of pump B. The sliding part $e^2$ of said valve is provided with a channel $e^8$ opening at the bottom into chamber $e^9$ which communicates through conduit $C^4$ with the tank. When the slide is not drawn out by the electro-magnet, (position opposite to that shown in the drawings) another chamber $e^3$ is brought opposite conduit $e^1$ so that conduits $C^1$ and $C^4$ are connected to each other, the valve E thus forming a by-pass to the tank.

A safety and regulating by-pass $b^1$ opens, on the one hand into branch pipe $C^1$ connected to the compression side of the pump, and, on the other hand into conduict $C^3$ connected to the tank.

A regulating device G, serving to control the working speed of advance, whose wheel $g^1$ makes it possible to operate a screw $g^2$, the end of which forms a needle valve between a chamber $g^4$ and the conduit under pressure $C^1$ may be used with any type of needle valve, either conical or cylindrical, with straight channels of decreasing section.

An accelerating valve F comprises a ball $f^1$ provided with a spring $f^3$ and operated through a rod $f^2$ provided with an operating lever $f^4$ the return movement of which is limited by a stop $f^5$.

Said valve is provided on a bypass connection between $C^1$ and needle valve chamber $g^4$ of the regulating element G.

A valve H for reversing the direction of working is provided with a sliding element $h^1$ operated through rod $h^5$ and lever $h^6$. Said valve comprises an annular chamber under pressure $h^4$ always in communication with pipe $C^5$ of regulating element G and of the accelerating valve F. The upper chamber $h^3$ and lower chamber $h^2$ of the reversing valve are always in communication with tank C through pipe $C^4$. In the position shown in the drawings, lever $h^6$ occupies a position corresponding to the stopping, both pipes $C^6$ and $C^7$ being connected to pressure chamber $h^4$. According as the sliding element of the valve is lifted or lowered, either pipe $C^6$ or pipe $C^7$ is connected with pipe $C^4$ which in turn is connected to tank C.

A valve J serving to shut off the hydraulic engine or the cylinder, according as a rectilinear welding or a circular welding is to be effected, when the machine, is adapted to both modes of welding. $j^1$ and $j^2$ show in plane view the plugs that serve to control the particular pipes of the driving organs. The operating handle $j^3$ makes it possible to operate either of these organs. Two pipes $C^8$ $C^9$ connect said valve J to the tubular rods of piston $d^1$. Other pipes $C^{10}$ $C^{11}$ serve to feed the driving organ for circular welding.

In the very case, shown by way of example, of a combined machine, a device M is provided for circular welding. In said device $m^1$ is a rotating table to which is secured the piece to be welded; $m^2$ is a hydraulic engine serving to drive said table; $m^3$ designates the transmission organ (worm and curved worm wheel for instance) which serves to transmit to the table the motion of the engine; $m^4$ is an arcuate slot for adjusting the inclination of the table. The latter is pivotally mounted about an axis $m^7$ and it is locked in a given position by means of a tightening organ $m^8$. The hydraulic engine $m^2$ is fed through pipes $m^5$ and $m^6$ consisting of flexible tubes or articulated rigid tubes connected to pipes $C^{10}$, $C^{11}$.

A device L for closing the circuit in order to bring the piece to be welded to the working position essentially comprises an auxiliary electric circuit $l^6$ fed by a source of current independent of that of the welding circuit; a switch $l^4$; an electro-magnet $l^5$ the armature $l^3$ of which carries a contact $l^2$ adapted to close a shunt on the welding circuit. Said shunt may comprise a supplementary resistance $l^1$, which may eventually be adjustable.

The working of the apparatus is the following:

Let it be supposed that a piece $k^2$ is to be welded along a rectilinear line, said piece being in such manner that, during its displacement, electrode $k^1$ will follow the line of welding.

If the piece is to be welded along a circular line, it is secured to the rotary table $m^1$ of device M in such manner that, during the rotation, the line of welding may come opposite the electrode, which is then stationary.

Valve J is set in such a position that, during the working, the fluid under pressure may be directed to the organ that is to be driven, either cylinder D or engine $m^2$ according to the case.

Valve H being in the position that corresponds to stoppage of the machine (position shown in the drawings) valve G is adjusted to ensure a suitable speed of feed during the work.

Pump B is then started.

Valve H is then operated in the direction that corresponds to that according to which the welding must be effected. In the example shown in the drawings, if the valve sliding element $h^1$ is lifted, pipes $C^7$, $C^9$ are connected to pipe $C^4$ and the electrode moves in the direction of arrow $p$.

At this moment, as the electrode is not in contact with the piece to be welded, the arc cannot be struck and no current passes through the welding circuit. Valve E acts as a by-pass to pump B which cannot supply any energy to the driving organ.

By operating switch $l^4$ device L is set in operation so as to close the welding circuit through its contact $l^2$. Electro-magnet $e^7$ then draws in its armature $e^6$, which drives the sliding element $e^2$ of valve E and consequently causes said valve to cease to act as a by-pass to pump B. Said pump (in the case illustrated in the drawings) sends fluid under pressure to the driving organ that is in the circuit (cylinder D or engine $m^2$). Said organ then moves at a speed that is determined by the position of regulating element G (working speed). Said speed can be accelerated, for rapidly moving the electrode to its starting position, by acting on valve F in the direction that pushes ball $f^1$ away from its seat, which results in shunting regulating element G and eliminating the retardating action of the latter.

When the electrode comes in contact with the piece to be welded, the arc is struck. One may then cease to act upon switch $l^4$ since the welding circuit is closed through the arc, so that valve e remains in the lifted position. Besides, it will be best, as a rule, to cease to act upon said switch $l^4$ as soon as the electrode comes into contact with the piece to be welded, for if said switch were kept in the closed position, the electrode would follow the line of welding without the arc being struck, the current being shunted through $l^1$ and $l^2$. However said switch makes it possible to cause the electrode to accomplish its stroke without the arc being struck, which may be useful in certain cases, for adjusting purposes for instance.

When the electrode is brought into position and switch $l^4$ is opened, the arc being thus struck, the welding operation takes place. If, at that moment, the arc stops for any reason whatever during a welding operation, the sliding element of valve E ceases to be lifted under the action of the current, so that the pressure falls to zero. The motion (rectilinear or rotary) of the movable element (electrode or piece being welded) is immediately stopped owing to the fact that, as no current flows through the winding of electro-magnet $e^7$, valve E acts as a by-pass thus stopping the hydraulic or pneumatic feed of the driving organ.

Said motion is resumed only when the arc is again struck, electro-magnet $e^7$ then operating valve E so as to do away with the by-pass effect, which again feeds fluid under pressure to the organs that serve to drive the machine.

It would also be possible to substitute for the by-pass action of said valve E, an obturation action exerted by said valve so as to stop the flow of fluid under pressure through conduit $C^1$ to the organs actuated through said fluid, or still to combine said two actions, namely obturation and by-pass.

It will also be possible to use valves of any suitable type, slide valves, rotary valves, ball valves, clack valve and so on.

The regulating element might also be of any suitable type acting either on the inflow or on the outflow of the fluid, or otherwise through a combination of these two actions. In some cases said regulating element might even be dispensed with when use is made of a variable flow pump.

Cylinder D may also be given various shapes and, for instance, comprise several telescopic or crossed elements.

Finally, runway $d^5$ will be given any suitable shape and located in any suitable position according to the circumstances under which the device is to be used. In particular said runway could be made movable in any suitable manner to accommodate adjustment in the vertical direction, through rotation about one of its ends, or in any other suitable manner.

While I have disclosed what I deem to be the preferred form of my apparatus I do not wish to be limited thereto as there might be changes made in the arrangement, disposition and form of the pieces, such as those suggested in the preceding lines, or any others, without departing from the principle of my invention as comprehended within the scope of the appended claims.

What I claim is:

1. An electric arc welding machine of the type described comprising in combination an electrode, means for supporting the piece to be welded, an electric welding circuit including the electrode and the piece to be welded, a driving organ adapted to be operated through a fluid under pressure to produce a relative displacement of said electrode and said piece along the line of welding, means for conveying said fluid under pressure to said driving organ, a valve on said last mentioned means, adapted to normally prevent the flow of fluid to said driving organ, electric means included in the welding circuit for operating said valve, whereby the flow of fluid to the driving organ is allowed only when the arc is formed between the electrode and the piece to be welded.

2. An electric arc welding machine of the type described comprising in combination an electrode, means for supporting the piece to be welded, an electric welding circuit including the electrode and the piece to be welded, a driving organ adapted to be operated through a fluid under pressure to produce a relative displacement of said electrode and said piece along the line of welding, a tank for said fluid under pressure, a feed pipe for connecting said tank to said driving organ, a pump connected to said pipe for feeding said fluid under pressure to said driving organ, a valve in said feed pipe adapted to normally prevent the flow of fluid under pressure to said driving organ, an electro-magnet included in the welding circuit adapted to operate said valve so as to permit the flow of fluid under pressure to the driving organ, whereby said organ is fed with fluid under pressure and the relative displacement of the piece to be welded is allowed to take place only when the electric arc is formed between the electrode and the piece to be welded.

3. An electric arc welding machine of the type described comprising in combination an electrode, means for supporting the piece to be welded, an electric welding circuit including the electrode and the piece to be welded, a driving organ adapted to be operated through a fluid under pressure, to produce a relative displacement of said electrode and said piece along the line of welding, a tank for said fluid under pressure, a feed pipe connecting said pipe to said driving organ, a pump connected to said pipe to feed said fluid under pressure to said driving organ, a return pipe directly connecting said valve to said tank, said valve being adapted to normally connect said pump to said return pipe whereby the fluid under pressure is by-passed and prevented from flowing to the driving organ, an electro-magnet included in the welding circuit adapted to operate said valve so as to permit the flow of fluid under pressure to the driving organ, whereby said organ is fed with fluid under pressure only when the electric arc is formed between the electrode and the piece to be welded.

4. An electric arc welding machine of the type described comprising in combination an electrode, means for supporting the piece to be welded, an electric welding circuit including the electrode and the piece to be welded, a driving organ adapted to be operated through a fluid under pressure to produce a relative displacement of said electrode and said piece along the line of welding, a tank for said fluid under pressure, a feed pipe for connecting said tank to said driving organ, a pump connected to said pipe for feeding said fluid under pressure to said driving organ, a valve in said feed pipe adapted to normally prevent the flow of fluid under pressure to said driving organ, an electro-magnet included in the welding circuit adapted to operate said valve so as to operate the flow of fluid under pressure to the driving organ, a contact device adapted to close the welding circuit so as to operate said electromagnet independently of the arc being formed between the electrode and the piece to be welded, means for closing said contact device, an auxiliary electric circuit adapted to operate said last mentioned means, and a switch for closing said auxiliary electric circuit.

5. An electric arc welding machine of the type described according to claim 4, further comprising a regulating element on said feed conduit and means for operating said regulating element.

6. An electric welding machine according to claim 5, further comprising a flow controlling valve adapted to by-pass said regulating element, whereby a large flow of fluid under pressure can be temporarily allowed to the driving organ for accelerating the speed thereof.

7. An electric arc welding machine according to claim 4, further comprising means for reversing the operation of said driving organ.

8. An electric arc welding machine of the type described comprising in combination an electrode, means for supporting the piece to be welded, a driving organ adapted to be operated through a fluid under pressure to impart a rectilinear motion to said electrode, means for supporting another piece to be welded along a circular line of welding, a rotary driving organ for imparting to the last mentioned supporting means a rotary motion, a tank for said fluid under pressure, a feed pipe from said tank, a distributing valve adapted to connect said pipe to either of the two above mentioned driving organs, a valve in said feed pipe adapted to normally prevent the flow of fluid under pressure to said distributing valve, an electric welding circuit for each piece to be welded, an electromagnet included in said welding circuit adapted to operate said valve so as to permit the flow of fluid under pressure to the driving organ, whereby the driving organ that is connected to the tank for fluid under pressure is allowed to operate only when the electric arc is formed between the corresponding electrode and piece to be welded.

The foregoing specification of my "Device for the control of electric arc welding machines" signed by me this 25 day of February 1931.

JEAN ACHARD.